Feb. 20, 1940.　　　　C. G. FILLER　　　　2,190,655
DISTRIBUTOR
Filed May 26, 1938　　　　3 Sheets-Sheet 1

Carl G. Filler
INVENTOR
BY Arthur L. Davis
ATTORNEY

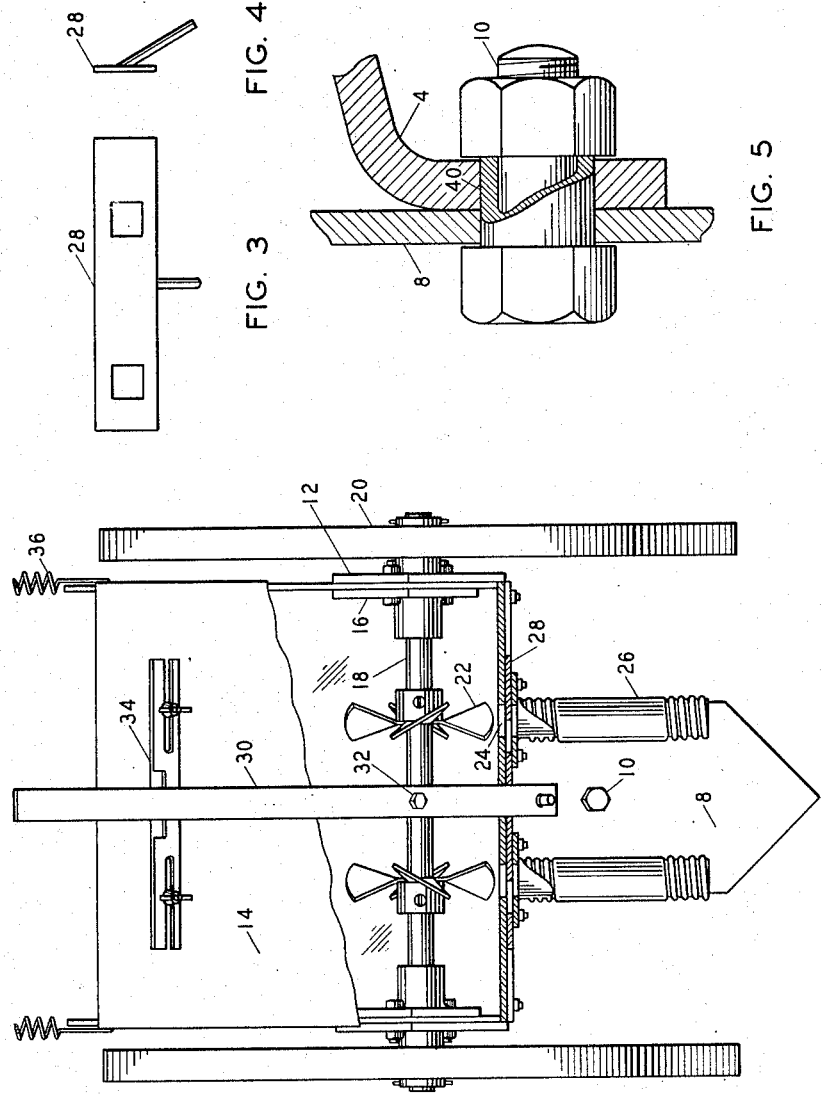

Feb. 20, 1940.   C. G. FILLER   2,190,655
DISTRIBUTOR
Filed May 26, 1938   3 Sheets-Sheet 3

Carl G. Filler
INVENTOR

BY Arthur L. Davis
ATTORNEY

Patented Feb. 20, 1940

2,190,655

UNITED STATES PATENT OFFICE 2,190,655

DISTRIBUTOR

Carl G. Filler, Knoxville, Tenn.

Application May 26, 1938, Serial No. 210,199

4 Claims. (Cl. 111—63)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the government for governmental purposes without the payment to me of any royalty thereon.

This invention relates to the art of seed and fertilizer distribution.

One of the objects of this invention is to provide an apparatus for the positive distribution of seed, fertilizer, or seed and fertilizer mixtures. Another object of this invention is to provide an apparatus suitable for distributing seed and fertilizer in a furrow as it is progressively opened wherein the distributor and furrow opening means cooperate but do not exert undue restraining influences upon each other. Still another object of this invention is to provide an apparatus for the distribution of mixtures of seed and fertilizer where the properties of the latter are such that it is compatible when placed in juxtaposition with the seeds or seedlings. A further object of this invention is to provide an apparatus suitable for simultaneously distributing fertilizer adjacent to the seed but not in such proximity that it will effect the viability of the latter where such fertilizer is not compatible when placed in immediate contact with the seeds or seedlings. A still further object of this invention is to provide an apparatus for plowing, seeding and/or fertilizing land which has not been previously prepared for seeding. A still further object of this invention is to provide an apparatus for distributing fertilizer and/or seed stripwise in order that the soil between the strips is relatively undisturbed and the susceptibility to leaching and erosion of such undisturbed portion is reduced to a minimum. Other objects of this invention include the provision of an apparatus for simultaneously terracing and seeding and/or fertilizing ground so terraced.

I have discovered an apparatus for positively distributing seed, fertilizer, or seed and fertilizer mixtures when in combination with furrow opening means connected to a source of draft power or when connected directly to a source of draft power.

In the accompanying drawings, which form a part of the specification, and wherein reference symbols refer to like parts wherever they occur, Fig. 1 is a side elevational view of a distributor attached to a plow, which is shown in outline.

Fig. 2 is a rear elevational view of the apparatus shown in Fig. 1 with certain parts broken into sections to show internal construction.

Fig. 3 is a top view of the gage slide for the discharge openings.

Fig. 4 is an end view of Fig. 3.

Fig. 5 is a sectional view of means for pivotally securing the distributor to the plow.

Figure 1:
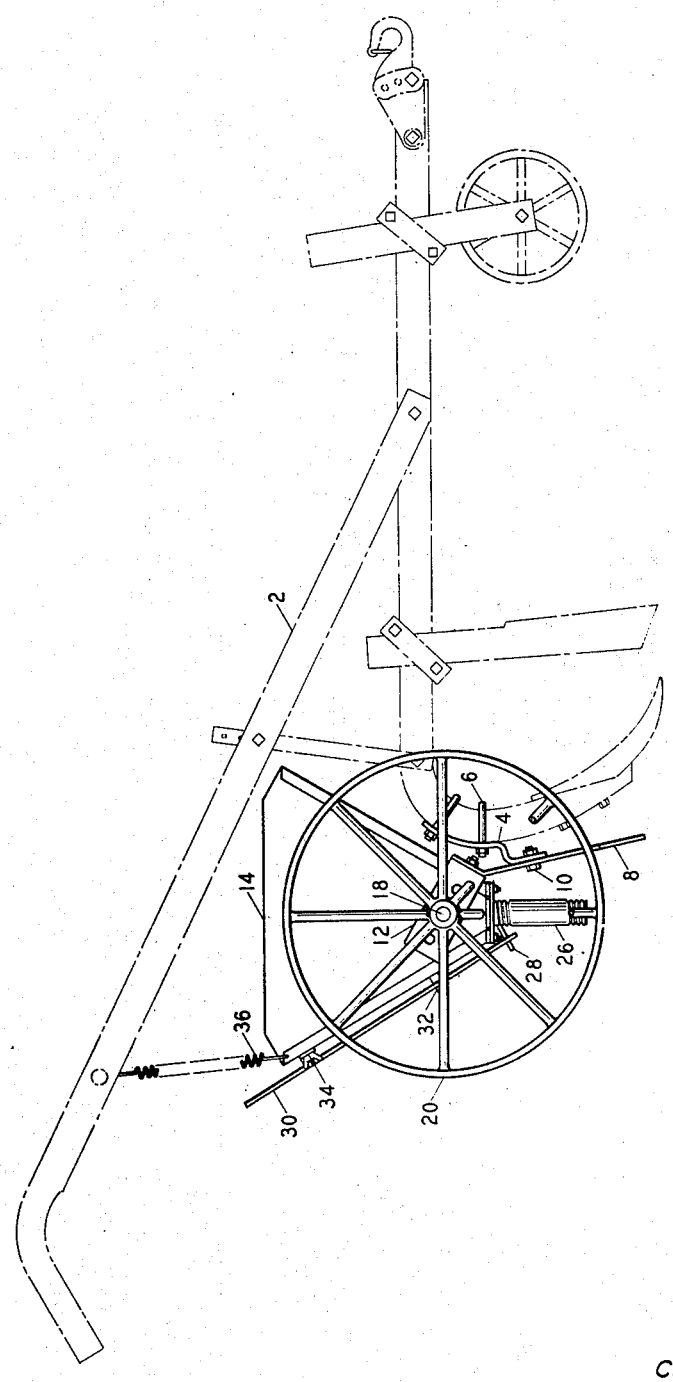

In Fig. 1 and Fig. 2, a plow 2, has a connecting bar 4, rigidly secured thereto by two U bolts, represented by U bolt 6. A furrow opener 8, pivotally secured by a pivot bolt 10, to the connecting bar 4, is rigidly secured to the hopper frame 12. The hopper frame 12, rigidly supports a hopper 14, between the hopper frame 12, and two bearing plates, represented by bearing plate 16, which house a rotary axle 18, provided with two ground wheels, represented by ground wheel 20, each connected to each end of the rotary axle 18. Two agitators, represented by agitator 22, are connected to the rotary axle 18, and are revolved about the axle by movement of the ground wheels. Two discharge openings, represented by opening 24, are provided in the bottom of the hopper 14, in juxtaposition to each of the agitators 22. Each of the discharge openings 24, is provided with a distributing tube, represented by distributing tube 26. Interposed between the discharge openings and distributing tubes is a gage slide 28, operated by a lever 30, affixed to the hopper by a bolt 32. A sustaining bar 34, is provided with a notch to engage the lever 30, for a specific setting of the gage slide 28. When the apparatus is not in operation, the lever 30, is disengaged and placed to the extreme right, thereby closing the discharge opening with the gage slide 28. Two springs, represented by spring 36, are provided, from the rear corners of the hopper to the handles of the plow, thereby partially supporting the distributor by cantilever action from the plow beam. This support prevents the distributor from turning over when either ground wheel is raised above the ground.

In Fig. 3 and Fig. 4, the gage slide 28, is shown with apertures and means for connecting it to the bottom of the lever 30.

In Fig. 5, the pivot bolt 10, is provided with a case hardened sleeve 40, which assures durability and freedom of movement about the longitudinal axis of the bolt.

Figure 6:
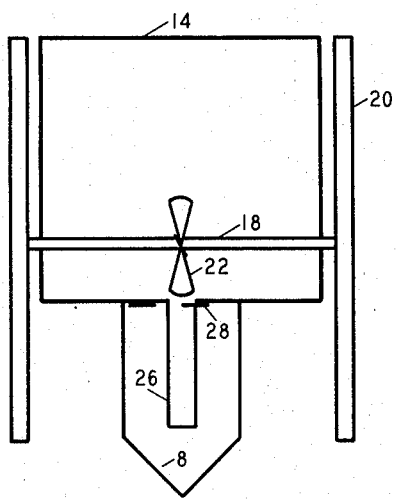
Fig. 6, Fig. 7, Fig. 8 and Fig. 9 are diagrammatic views illustrating different hopper and distributing arrangements for the embodiment of my invention.

In Fig. 6 a hopper 14 is provided with one adjustable discharge opening in the bottom of the hopper with an agitator 22 placed in juxtaposition with the discharge opening and connected to the rotary axle 18. A distributing tube 26 communicates with the discharge opening.

Figure 7:
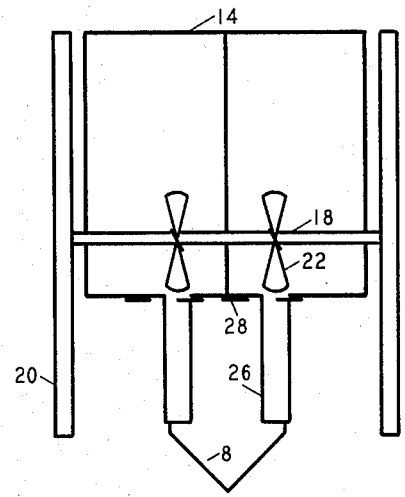

In Fig. 7 a hopper 14 is provided with a plurality of compartments having an adjustable discharge opening in the bottom of each compartment with an agitator 22 placed in juxtaposition with each discharge opening and connected to the rotary axle 18. A distributing tube 26 communicates with each discharge opening.

Figure 8:
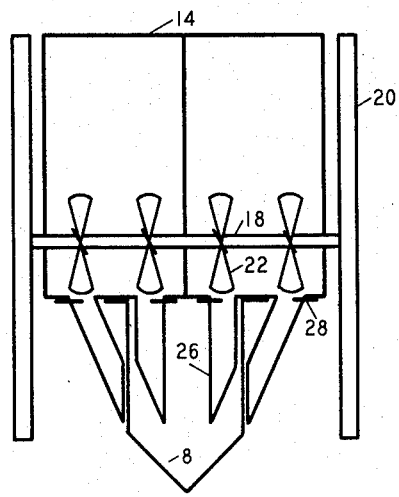

In Fig. 8 a hopper 14 is provided with a plurality of compartments having a plurality of discharge openings in the bottom of each compartment with an agitator 22 placed in juxtaposition with each discharge opening and connected to the rotary axle 18. A distributing tube 26 communicates with each discharge opening.

Figure 9:
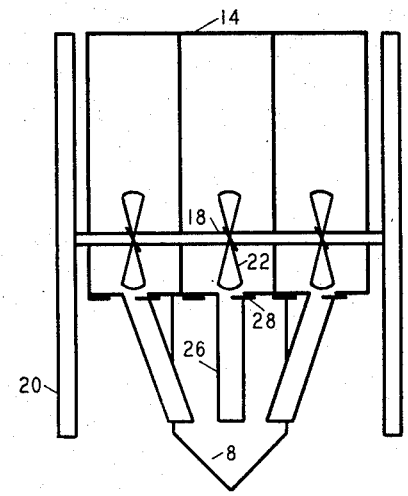

In Fig. 9 a hopper is provided with three compartments having an adjustable discharge opening in the bottom of each compartment with an agitator 22 placed in juxtaposition with each discharge opening and connected to the rotary axle 18. A distributing tube 26 communicates with each discharge opening from which in this particular arrangement seed may be distributed from either the middle compartment or the two outside compartments.

One example of the operation of my apparatus is given for distributing a mixture of wheat and phosphate fertilizer using the distributor in combination with a single share plow in lespedeza sod which had not been prepared previously for seeding. The furrows opened by the plow were six inches wide, four to four and one-half inches deep, and sixteen to eighteen inches apart on centers. The mixture of wheat and fertilizer was distributed substantially uniformly across the six inch furrow. The mixture used consisted of five to six pecks of the wheat uniformly mixed with three hundred pounds of superphosphate fertilizer, containing 16% to 20% by weight of $P_2O_5$, per acre of ground so seeded. The yield of the wheat resulting from such planting was 30% greater than the yield of wheat from the same seed planted with a standard seed drill in a contiguous tract which had been previously prepared.

Similar results were obtained by the use of my apparatus for the seeding of barley, oats and rye.

It is evident that there are numerous factors which will influence conditions for the most satisfactory operation of my invention, the actual limits of which cannot be established except by a detailed study of each set of raw materials and the conditions under which these materials are to be distributed.

The distributor assembly proper comprises a combination of a hopper, one ground wheel at each end of the hopper, a rotary axle through the lower portion of the hopper and connected to the ground wheels, at least one agitator connected to the rotary axle, an adjustable discharge opening in the bottom of the hopper, a distributing tube communicating with the discharge opening, means for opening a furrow in front of the distributing tube, and means for pivotally securing the front of the distributor to a source of draft power to permit the rotation of the distributor in an approximately vertical plane coincident with the rotary axle.

The hopper may be of any suitable shape but it is generally preferred that the bottom thereof have a part circular, cross section in order to deliver most of the material charged therefrom. The hopper may be constructed so as to consist of one compartment or it may consist of two or more compartments. A single compartment hopper may be used to distribute seed, fertilizer or mixtures of seed and fertilizer where the properties of the latter are such that it is compatible when placed in juxtaposition with the seed or seedlings. Using a two compartment hopper, seed may be distributed from one compartment and fertilizer from the other compartment with the ultimate distribution such that the seed and fertilizer are adjacent but still sufficiently separated so that the fertilizer will not affect the viability of the seeds or the growth of the seedlings. Similarly, a three compartment hopper may be used in which case the seed may be distributed either from the middle compartment or the two outside compartments. Likewise, a hopper with a plurality of compartments may be used either for the sole distribution of seed, or fertilizer, or for the alternate distribution of seed and fertilizer.

One ground wheel at each end of the hopper is connected to a rotary axle which passes longitudinally through the bottom portion of the hopper and is positioned substantially centrally in the part circular, cross sectional bottom portion of the hopper. A simple rigid construction for the ground wheel and rotary axle assembly is preferred, however, under some circumstances, it may be desirable not to have the tractive wheels affixed to the axle but connected thereto, either for the purpose of changing the axle speed or for the purpose of a more convenient location for the ground wheels in respect either to the hopper proper or to the source of draft power to which the distributor assembly is attached.

The bottom of each compartment of the hopper, is provided with at least one discharge opening. The number of discharge openings in each compartment will depend largely upon the width of the compartment and consequently the area over which seed or fertilizer is to be distributed. The discharge opening or discharge openings are provided with apertures which are adjustable in order to permit the delivery of the proper amount of seed, fertilizer, or seed and fertilizer mixture.

At least one agitator is connected to the rotary axle passing through the bottom portion of the hopper. Where the hopper is provided with more than one compartment at least one agitator is provided for each compartment. Any suitable type of agitator may be used but a fan blade type of agitator has been found to be particularly suitable for this purpose. In the rotation of the blades their peripheries pass adjacent to the bottom portion of the hopper. The purpose of the agitator is to provide for positive movement of the material charged into the bottom portion of the hopper and to maintain the material so charged in a substantially uniform physical condition at the point of discharge. The agitator may be placed in juxtaposition with a discharge opening or may be placed in proximity with such an opening or openings to satisfactorily accomplish these purposes. One or more helical blades may be affixed to the axle so that their peripheries pass adjacent to the bottom portion of the hopper and, likewise, maintain conditions for subsequent satisfactory distribution of the contents of the hopper.

A distributing tube is connected to each of the discharge openings, with the length of each tube and the character of its outlet depending upon the particular distribution desired for the material handled.

Means for opening a furrow is provided in front of each distributing tube. Such means may be attached to the distributor proper or it may be attached to the plow or plows to which the distributor assembly is connected. Such means may also servie to open a furrow for more than one distributing tube. In some instances, the plows themselves may serve as means for opening the proper furrow for the distributor.

The distributor proper is provided with means for pivotally securing the front of the distributor to a source of draft power with such means so arranged as to permit the rotation of the distributor in an approximately vertical plane coincident with the rotary axle. Under some circumstances the means for pivotally securing the distributor may be so placed as to permit rotation of the distributor assembly transverse to the direction of the movement of the distributor but with a small angular displacement from the vertical plane for better cooperation between the various elements of the combination. Such means may be either connected to the hopper or may be preferably arranged to bear on the rotary shaft. Means also may be provided for limiting the extent of rotation to any desired angle. Such means for pivotally securing the distributor to the source of draft power may be attached to the beam of a single or multiple share plow to which the source of draft power is applied or may be attached directly to a source of draft power such as a tractor.

When using the distributor in combination with a plow of the simplest construction, namely, a single share plow, a variably tensioned means for supporting the rear of the assembly from the beam of the plow may be provided by attaching suitable spring elements for the rear top corners of the hopper and attaching the upper ends of these spring elements to the handles of the plow, in which case the handles furnish a cantilever support from the beam. The purpose of this support, or any other equivalent support is to prevent the undue tipping of the distributor assembly proper when turning from one row to another. Where the distributor assembly is connected to a standard gang plow which has a provision for raising the plows when not in use, no variably tensioned means may be required. Similarly, in the case of a distributor assembly connected to a single share plow, means may be provided for so raising the beam of the plow, so that the furrow means does not become engaged and the distributor assembly proper supports the entire weight when being moved and not in use.

My apparatus may be used to distribute a great variety of seed such as barley, corn, cowpeas, grass seeds, oats, rye, soy beans, sorghum, sudan grass, and wheat, either with or without admixture with fertilizer material.

Fertilizer materials, such as superphosphate, containing 16% to 20% by weight of $P_2O_5$, may be mixed directly with the seed and the resulting mixture distributed. Fertilizers, which are highly concentrated or have properties such that they are not compatible when placed in juxtaposition with the seed or seedling, should preferably not be mixed with the seed, but should be distributed adjacent to the seed using a distributor having a plurality of compartments.

Likewise, any suitable fertilizer material may be distributed before seeding or setting out plants or such material may be distributed adjacent to growing plants.

The distribution of seed and/or fertilizer with my apparatus in furrows in the manner described results in the formation of a plurality of small terraces which are particularly effective in retaining the inherent fertility of the soil, retaining the values in the fertilizer material added, retaining moisture in the soil, and materially reduced soil erosion. This procedure also makes the fertilizer material added either prior to planting, during planting or after planting, more readily accessible to the plants due to the proper placement of the fertilizer material and the increased availability due to greater retention of rainfall locally.

It will be seen, therefore, that this invention actually may be carried out by the use of various modifications and changes without departing from its spirit and scope, with only such limitations placed thereon as are imposed by the prior art.

I claim:

1. In combination with a plow, having a beam and a share attached to said beam, a distributor assembly comprising a hopper, a ground wheel at each end of the hopper, a rotary axle positioned in the lower portion of the hopper and connected to the ground wheels for rotation thereby, an adjustable discharge opening in the bottom of the hopper, an agitator placed in juxtaposition with the discharge opening and connected to the rotary axle, a distributing tube communicating with the discharge opening, and a furrow opening share in front of the distributing tube; means for pivotally securing the front of the distributor assembly to the beam to permit rotation of the assembly in an approximately vertical plane coincident with the rotary axle; and variably tensioned means for supporting the rear of the distributor assembly from the beam.

2. In combination with a plow, having a beam and a share attached to said beam, a distributor assembly comprising a hopper partitioned to form a plurality of compartments, a ground wheel at each end of the hopper, a rotary axle positioned in the lower portion of the hopper and connected to the ground wheels for rotation thereby, an adjustable discharge opening in the bottom of each compartment, an agitator placed in juxtaposition with each discharge opening and connected to the rotary axle, a distributing tube communicating with each discharge opening, and means for opening a furrow in front of each distributing tube; means for pivotally securing the front of the distributor assembly to the beam to permit rotation of the assembly in an approximately vertical plane coincident with the rotary axle; and variably tensioned means for supporting the rear of the distributor assembly from the beam.

3. In combination with a plow, having a beam and a share attached to said beam, a distributor assembly comprising a hopper, a ground wheel at each end of the hopper, a rotary axle positioned in the lower portion of the hopper and connected to the ground wheels for rotation thereby, a plurality of adjustable discharge openings in the bottom of the hopper, an agitator placed in juxtaposition with each discharge opening and connected to the rotary axle, a distributing tube communicating with each discharge opening, and means for opening a furrow in front of each distributing tube; means for pivotally securing the front of the distributor assembly to the beam to permit rotation of the assembly in an approximately vertical plane coincident with the rotary axle; and variably tensioned means for supporting the rear of the distributor assembly from the beam.

4. In combination with a plow, having a beam and a share attached to said beam, a distributor assembly comprising a hopper partitioned to form a plurality of compartments, a ground wheel at each end of the hopper, a rotary axle positioned in the lower portion of the hopper and connected to the ground wheels for rotation thereby, a plurality of discharge openings in the bottom of each compartment, an agitator placed in juxtaposition with each discharge opening and connected to the rotary axle, a distributing tube communicating with each discharge opening, and means for opening a furrow in front of each distributing tube; means for pivotally securing the front of the distributor assembly to the beam to permit rotation of the assembly in an approximately vertical plane coincident with the rotary axle; and variably tensioned means for supporting the rear of the distributor assembly from the beam.

CARL G. FILLER.